169-43.  XR  3,598,342  SR

United States Patent

[11] 3,598,342

[72] Inventor John K. Hawkshaw
 Brampton, Ontario, Canada
[21] Appl. No. 815,834
[22] Filed Apr. 14, 1969
[45] Patented Aug. 10, 1971
[73] Assignee Field Aviation Company Limited

[54] RELEASE DEVICE FOR WATER BOMBING FROM AIRCRAFT
 6 Claims, 8 Drawing Figs.
[52] U.S. Cl............................................ 244/136,
 239/171, 169/2
[51] Int. Cl........................................... B64d 1/16
[50] Field of Search........................................ 244/136,
 137; 239/171; 169/2

[56] References Cited
UNITED STATES PATENTS
1,396,894 12/1921 Stevens ...................... 244/136
3,423,053 1/1969 Hawkshaw .................. 244/136
3,485,302 12/1969 Thorpe...................... 239/171 (X)

Primary Examiner—Milton Buchler
Assistant Examiner—James E. Pittenger
Attorney—Cavanagh & Norman ABSTRACT: The specification describes a method and apparatus for releasing a water bomb from an aircraft by means of which water is released progressively by a separable support in such manner as to provide a controllable water bomb mass adapted for different bombing requirements.

PATENTED AUG 10 1971

INVENTOR
JOHN K. HAWKSHAW

BY Cavanagh & Norman

PATENTED AUG 10 1971 3,598,342

INVENTION

INVENTOR
JOHN K. HAWKSHAW

BY Cavanagh & Norman

RELEASE DEVICE FOR WATER BOMBING FROM AIRCRAFT

This invention relates to a severable membrane method and apparatus for water bombing from aircraft in flight.

The development of the art of water bombing for example in controlling forest fires has been characterized by improvements in mechanisms and methods of water release by the use of a rigid door. Progress has been achieved by refinement of rigid door systems to the point where the small improvement achieved by further refinement may not be justified by the additional cost to be incurred, especially with regard to added weight.

The rigid door system limits its application to certain types of aircraft and limits both the distribution and penetration of the water bomb load released. It is the characteristic of the rigid door concept itself which limits further substantial improvement of water bombing technique and effectiveness.

It is the object of the invention to provide a system for water bombing which is not limited in its use or effectiveness by a rigid door release structure.

It is another object of the invention to provide a water bombing system adapted to be mounted as an attachment pod to different kinds of aircraft.

It is a further object of the invention to provide a water bombing system of substantially greater controllable penetration and dispersion than prior systems.

It is a still further object of the invention to provide a water bombing system in which the water bomb load is released by controllable separation of a supporting severable membrane.

Other objects of the invention will be appreciated by a study of the following specification taken in conjunction with the accompany drawings.

Figure 7:
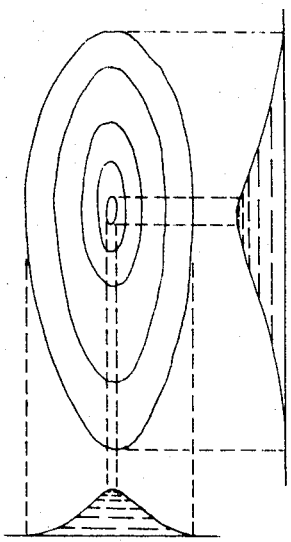
Figure 8:
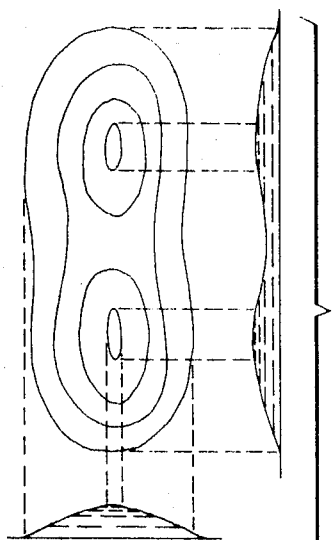

FIG. 7 reveals a typical drop plan and profile of water bombing distribution of the prior art;

FIG. 8 shows the modified plan and profile of distribution of the system of the invention.

Referring to the drawings, the invention may be applied to almost any land plane as well as to many types of sea planes.

In one form of the invention the pod 10 is attached by suitable fastenings (not shown) to the fuselage 11 of an aircraft 12. Pod 10 embodies an underhatch structure 13 embodying a separable membrane 14 defining the floor thereof and which when severed releases the liquid contents of pod 10.

Figure 1:
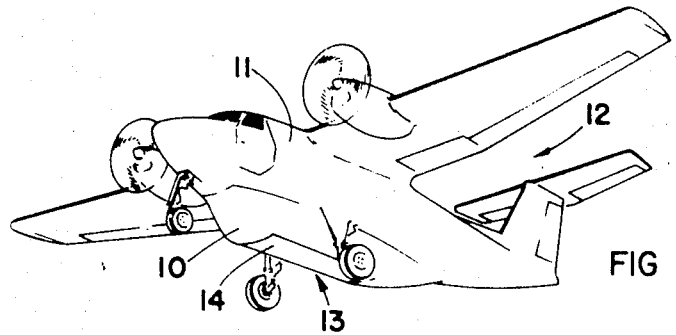
FIG. 1 is a perspective of an aircraft carrying a pod embodying the invention.
Figure 4:
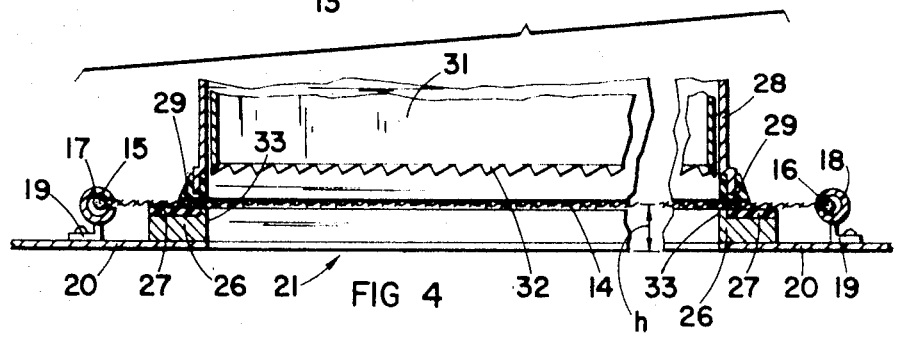
FIG. 4 is a transverse sectional view of mechanism associated with the severable membrane of the pad of FIG. 1.
Figure 3:
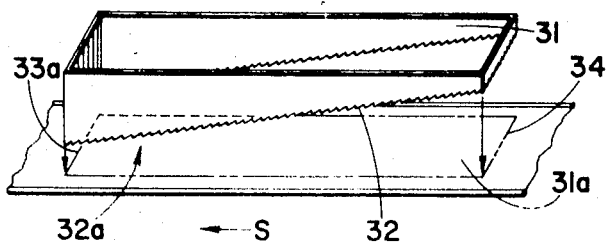
FIG. 3 is a diagrammatic perspective of the principle employed in severing the membrane of the invention.
Figure 2:
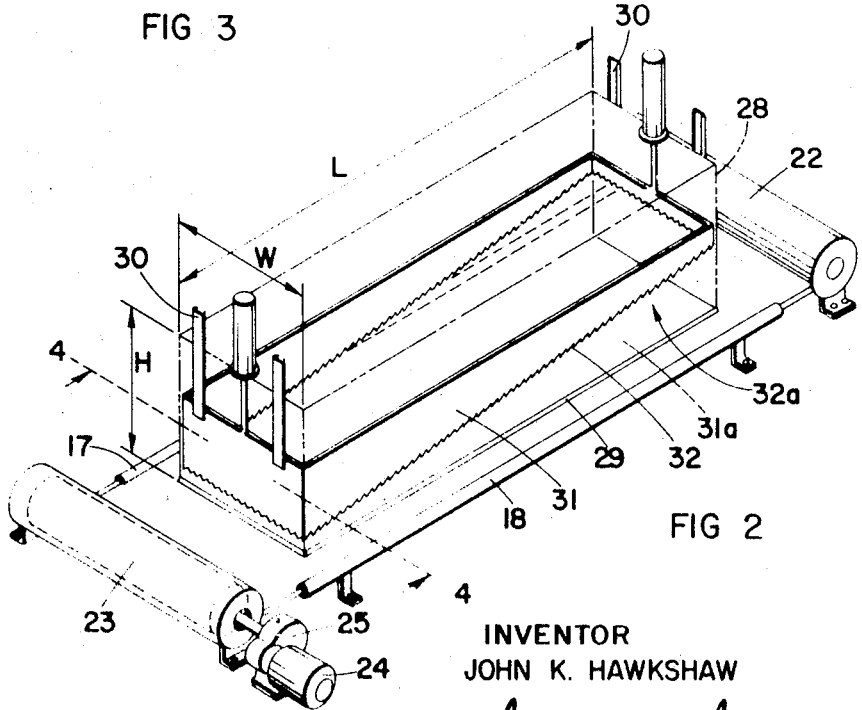
FIG. 2 is a perspective of the mechanism relating to the support and severance of the membrane of the pad of FIG. 1.

The membrane 14 and hatch structure 13 are revealed in more detail in FIGS. 2, 3 and 4 wherein membrane 14 formed of a woven fiber impregnated with water impermeable plastic material embodies beaded edges 15,16 extending longitudinally thereof and carried slidably in slit conveying tubes 17,18 fastened by suitable means 19 to pod walls 20 cut away to define a rectangular dumping opening 21. Spool structure 22 carries a reeled supply of edge beaded membrane 14 which is tensionably carried by conveying tubes 17,18 to takeup reel 23 driven by motor 24 through reduction device 25.

Dumping opening 21 is more particularly defined by a rectangular rigid frame 26 rising from pod walls 20 about opening 21 to present an elastomer sealing member 27 to the undersurface of membrane 14 at the tensioned height $h$ of the latter above opening 21. The upper surface of membrane 14 is sealably clamped about said opening by a depressable box frame 28 having a corresponding elastomer sealing member 29 about the lower peripheral edges thereof. Box frame 28 is moveable vertically by supporting flanges 30 to sealably clamp membrane 14 to retain a charge of liquid in said box frame. Frame 28 may be raised after release of liquid contents in the manner hereafter described to enable takeup reel 23 to be rotated to draw a further full section of membrane into the region of the dumping opening i.e. over the sealing member 27.

Within box frame 28 is provided a rectangular severing knife 31 slidable vertically and guided thereby to sever membrane 14 to form a rectangular cutout portion 31a by action of serrated teeth 32 thereof with the inner shear faces 33 of rectangular rigid frame 26. The rearwardly and upwardly inclined distribution of the longitudinal separated cutting edges 32a effects a progressive rather than a simultaneous severance of cutout portion 31a from membrane 14 in such manner that the leading edge 33 in flight is severed first and the trailing edge 34 severed last. The effect is illustrated in FIG. 5 wherein it will be apparent that the tank contents defined by the frame 28 and membrane 14 may be released to provide different degrees of water bomb penetration by controlling the speed of progressive severance of the membrane.

Where the tank load is of width W length L and height H, W is substantially equal to H and L preferably is greater than four times the smaller of W and H. The width of the membrane is greater than W so that the cutout portion 31a leaves sufficient fabric structure to enable practical takeup action of reel 23 to bring a full surface of the membrane forward to occlude dumping opening 20. The length L of the tank related to speed S of the aircraft and the speed of membrane severance by knife 31 orients the longitudinal axis 35 of the load 36 in the direction of the load flight path to achieve maximum height penetration by subjecting the load to minimum erosion by air friction. At the instant of release the load is parallel to the flight path but rotates to match the increasing vertical velocity component. This condition occurs when the rearward speed of the membrane severance is equal to the forward speed of the aircraft. Such a load has about one-fiftieth of the frontal area of prior art water bomb shapes. Since the rate of erosion is related to frontal area of the load a minimum frontal area achieves a proportionally greater penetration before bursting instability sets in.

Figure 5:
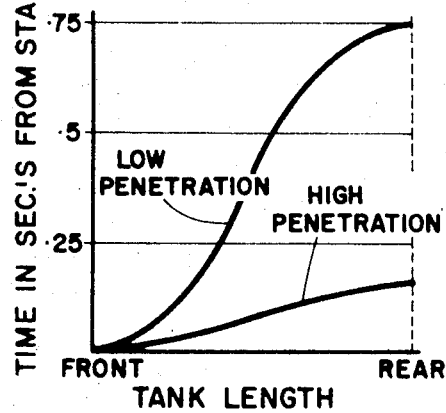
FIG. 5 is a trend curve indicating the effect on water bomb penetration of the time from the start of membrane severance or separation relative to the tank length.
Figure 6:
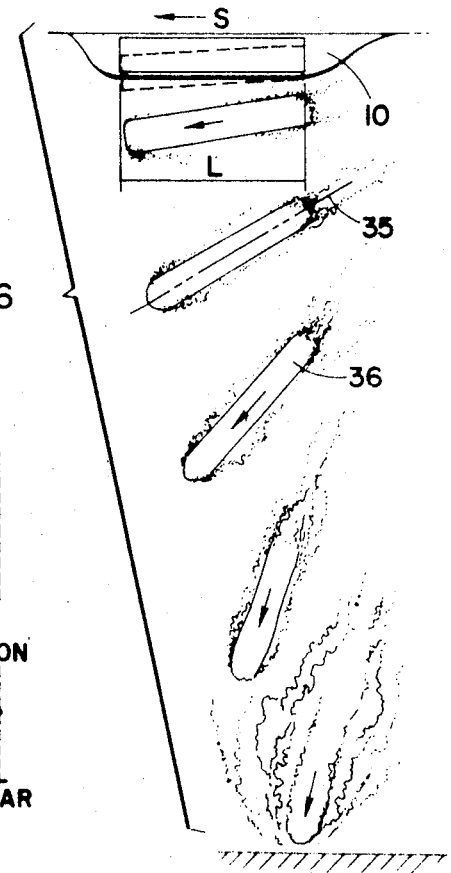
FIG. 6 is a pictorial motion diagram representing the attitude and form of a water bomb released by the system of the invention through a drop height.

A low penetration release or dump is achieved by slow membrane severance as is indicated by FIG. 5. A nonlinear speed of severance can control the shape of the front and rear ends of the water bomb.

This invention utilizes the characteristic of erosion to advantage by erosion distribution of pattern to gain greater pattern uniformity as is evident from FIGS. 7 and 8. The drop pattern of the invention in FIG. 8 allows loads to be deposited in series end to end with a maximum of uniformity and minimum of waste while necessitating a much lesser degree of accuracy relative to target.

The system of the invention enables a low penetration dump with a large effective distribution especially useful in fighting fires in the eastern regions of North America. The system also enables a low erosion high penetration dump useful in mountainous areas and in taller timber of the western regions of North America.

From the foregoing it will be apparent that in its method aspects the invention concerns supporting a body of liquid at an air speed and height above ground and releasing support of said body progressively to the action of gravity and air resistance erosion by effecting said release continuously in a direction opposite to the direction of air speed of the body.

The specific form of the invention described herein has been presented by way of one manner of practicing the invention, it being understood that while the cutout portion 21 is preferably rectangular, same may be provided in circular elliptical or teardrop shape without departing from the spirit of the invention inherent in the following claims.

What I claim is:

1. The method of controllably releasing a water bomb or the like from an aircraft comprising: supporting a body of liquid to define a bomb at an air speed and height above ground; and progressively and continuously releasing support of said bomb as a unitary body to the action of gravity and air erosion by effecting said release in a direction opposite to the direction of air speed of the body.

2. The method of claim 1 in which the body is supported to proportions of width W length L and height H wherein L is greater than four times the smaller of W and H and W is not greater than about H and not less than about one-half H.

3. The method of claim 1 in which the progressive speed of release is related to the air speed of the body.

4. Apparatus for in-flight formation of a water bomb or the like comprising: a liquid tank having a severable bottom wall and release structure moveable to sever said bottom wall progressively from said tank, the progress of severance of said bottom wall being in a direction opposite to the direction of flight.

5. The apparatus of claim 4 in which said bottom wall is in the form of a tensioned membrane and said release structure embodies membrane severing cutters.

6. The apparatus of claim 4 in which the bottom wall is defined by a portion of a flexible sheet; reel devices for storing and tensioning said sheet therebetween; structure forming portions of said tank for releasably sealing said tensioned sheet to define with a portion thereof the bottom wall of said tank; and a progressive cutting edge knife structure moveable to sever said sheet within said tank substantially at the perimeter of the bottom wall thereof, said progressive severance being made in a direction on said sheet opposite to the direction of flight.